(12) United States Patent
Petty et al.

(10) Patent No.: US 9,267,463 B2
(45) Date of Patent: Feb. 23, 2016

(54) GAS TURBINE ENGINE SYSTEMS INVOLVING VARIABLE NOZZLES WITH FLEXIBLE PANELS

(75) Inventors: Dale William Petty, Wallingford, CT (US); Timothy A. Swanson, Coventry, CT (US); Shawn M. McMahon, Manchester, CT (US)

(73) Assignee: UNITED TECHNOLOGIES CORP., Hartford, CT (US)

( * ) Notice: Subject to any disclaimer, the term of this patent is extended or adjusted under 35 U.S.C. 154(b) by 2415 days.

(21) Appl. No.: 12/054,762

(22) Filed: Mar. 25, 2008

(65) Prior Publication Data

US 2009/0241550 A1 Oct. 1, 2009

(51) Int. Cl.
 F02K 1/06 (2006.01)
 F02K 1/12 (2006.01)
 F02K 1/10 (2006.01)
 F02K 1/82 (2006.01)

(52) U.S. Cl.
 CPC ............... F02K 1/1207 (2013.01); F02K 1/10 (2013.01); F02K 1/82 (2013.01); *F05D 2300/501* (2013.01); *F05D 2300/603* (2013.01); *F05D 2300/604* (2013.01)

(58) Field of Classification Search
 USPC .............. 60/771, 770, 39.5, 232, 226.3, 231; 239/265.19, 265.35, 265.37, 265.43, 239/265.41, 265.17
 See application file for complete search history.

(56) References Cited

U.S. PATENT DOCUMENTS

| | | | |
|---|---|---|---|
| 3,261,164 A * | 7/1966 | Tumicki | 60/226.1 |
| 3,747,875 A * | 7/1973 | Stevens | 244/53 R |
| 4,068,469 A * | 1/1978 | Adamson | 60/204 |
| 5,186,390 A * | 2/1993 | Enderle et al. | 239/265.37 |
| 5,778,659 A | 7/1998 | Duesler et al. | |
| 5,833,140 A | 11/1998 | Loffredo et al. | |
| 5,893,518 A | 4/1999 | Bruchez, Jr. et al. | |
| 6,385,965 B1 * | 5/2002 | Abbe et al. | 60/230 |
| 6,938,408 B2 | 9/2005 | Lair | |
| 7,004,047 B2 | 2/2006 | Rey et al. | |
| 7,093,793 B2 | 8/2006 | Lair | |
| 7,134,271 B2 | 11/2006 | Baughman et al. | |
| 7,174,704 B2 | 2/2007 | Renggli | |
| 7,178,338 B2 | 2/2007 | Whurr | |
| 7,216,476 B2 | 5/2007 | Fink | |
| 7,770,381 B2 * | 8/2010 | Johnson et al. | 60/263 |
| 2006/0064960 A1 * | 3/2006 | Johnson | 60/226.3 |

* cited by examiner

*Primary Examiner* — Steven Sutherland
(74) *Attorney, Agent, or Firm* — Carlson, Gaskey & Olds P.C.

(57) ABSTRACT

A flexible panel assembly for a gas turbine engine selectively exhibits a range of positions to regulate exhaust of the engine.

26 Claims, 4 Drawing Sheets

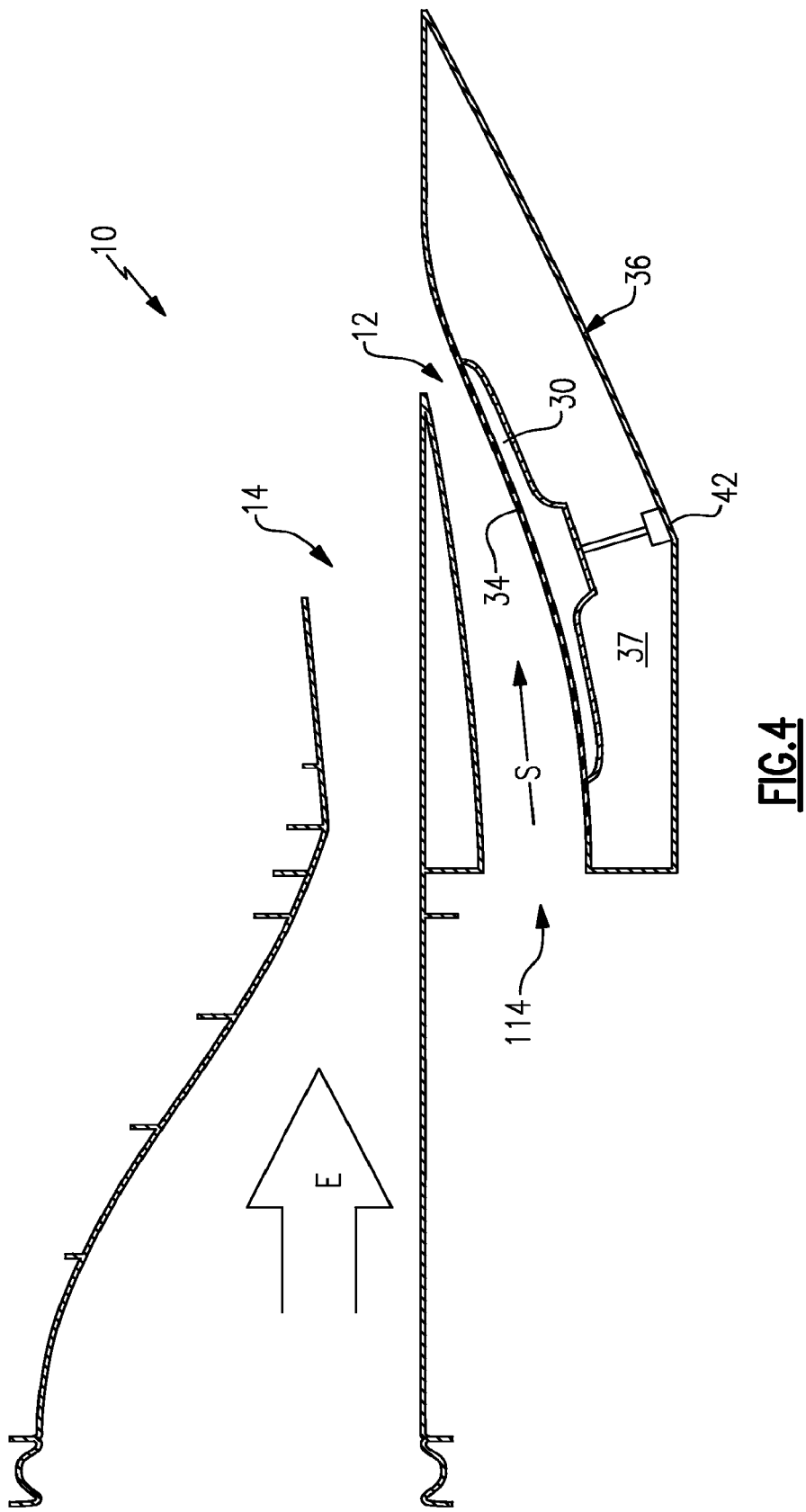

US 9,267,463 B2

GAS TURBINE ENGINE SYSTEMS INVOLVING VARIABLE NOZZLES WITH FLEXIBLE PANELS

BACKGROUND

1. Technical Field

The disclosure generally relates to gas turbine engines.

2. Description of the Related Art

Variable cycle engines power high performance aircraft over a range of operating conditions yet achieve countervailing objectives such as high specific thrust and low fuel consumption. A variable cycle engine essential alters the engine bypass ratio during flight to facilitate efficient performance over a broad range of altitude and flight velocity such as to generate high thrust for maneuver and optimized fuel efficiency for loiter.

Variable cycle engines typically include a variable exhaust nozzle system which operates over a wide range of pressure ratios by adjustment of a nozzle throat based on the demands of the engine cycle, and may include provision for adjustment of a nozzle area ratio to facilitate desired engine performance at various operating points.

The variable cycle engine and exhaust described herein comprises of three flow streams, exhausting through two nozzles. The low pressure compressor stream and core stream exhaust through the primary nozzle. The fan stream exits the variable secondary nozzle. Varying the secondary nozzle alters thrust at the nozzle exit. Also varying the secondary nozzle exit area affects the overall engine cycle by directing of flow into or diverting away from the primary flowpath by varying third stream back pressure, thus effectively altering the bypass ratio.

SUMMARY

A nozzle assembly for a gas turbine engine according to an exemplary aspect of the present disclosure includes a flexible panel adjacent a generally planar secondary nozzle in communication with a. secondary flow path for a secondary flow, the second flow path adjacent to a primary flow path for a primary flow, the flexible panel operable to selectively define a range of positions to regulate the generally planar secondary nozzle.

A nozzle assembly for a gas turbine engine according to an exemplary aspect of the present disclosure includes a generally planar secondary nozzle having a throat area and an exit area and a flexible panel operative to variably alter at least one of the throat area and the exit area to regulate a secondary flow from the generally planar secondary nozzle, the secondary flow different than a combustion core gas exhaust flow sourced from a turbine section of the gas turbine engine.

A gas turbine engine according to an exemplary aspect of the present disclosure includes a secondary flow duct with a generally planar secondary nozzle to communicate a secondary flow therethrough. A primary flow duct with a generally planar primary nozzle to communicate primary flow therethrough, the generally planar primary nozzle adjacent to said generally planar secondary nozzle. A flexible panel adjacent to the generally planar secondary nozzle, the flexible panel operable to selectively define a range of positions to regulate the generally planar secondary nozzle.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

FIG. 4 is a schematic diagram depicting the flexible panel of the embodiment of FIG. 3 in a planar view.

DETAILED DESCRIPTION

Gas turbine engine systems involving variable nozzles with flexible panels are provided, several exemplary embodiments of which will be described in detail. In some embodiments, such a flexible panel is deflected in a gas turbine engine to create a desired shape in order to vary the nozzle exhaust area of the engine dynamically. Varying the nozzle exhaust area in a gas turbine engine can alter engine performance characteristics such as increasing fuel efficiency.

Figure 1:
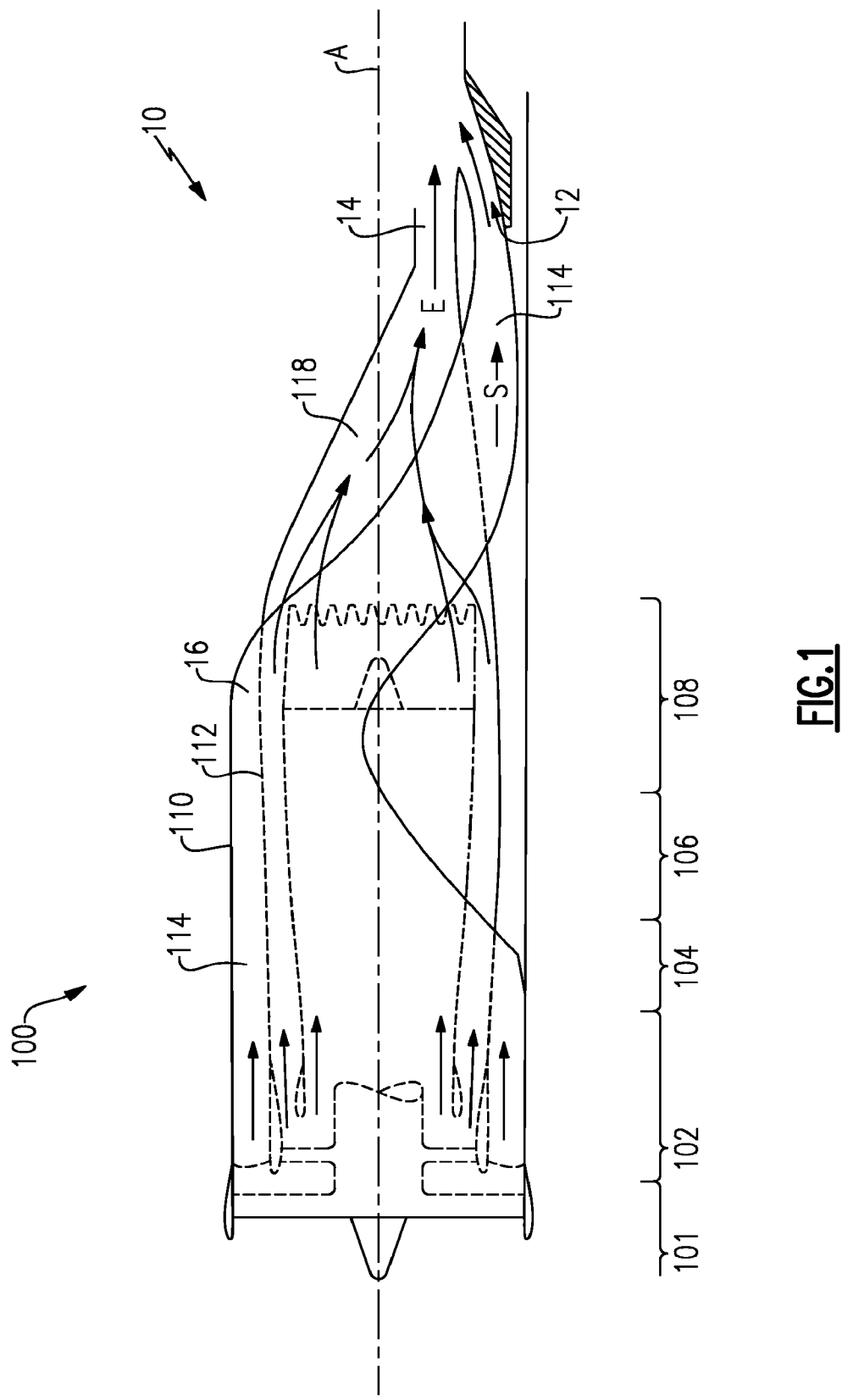
FIG. 1 is a schematic diagram depicting an exemplary embodiment of a gas turbine engine.
Figure 2:
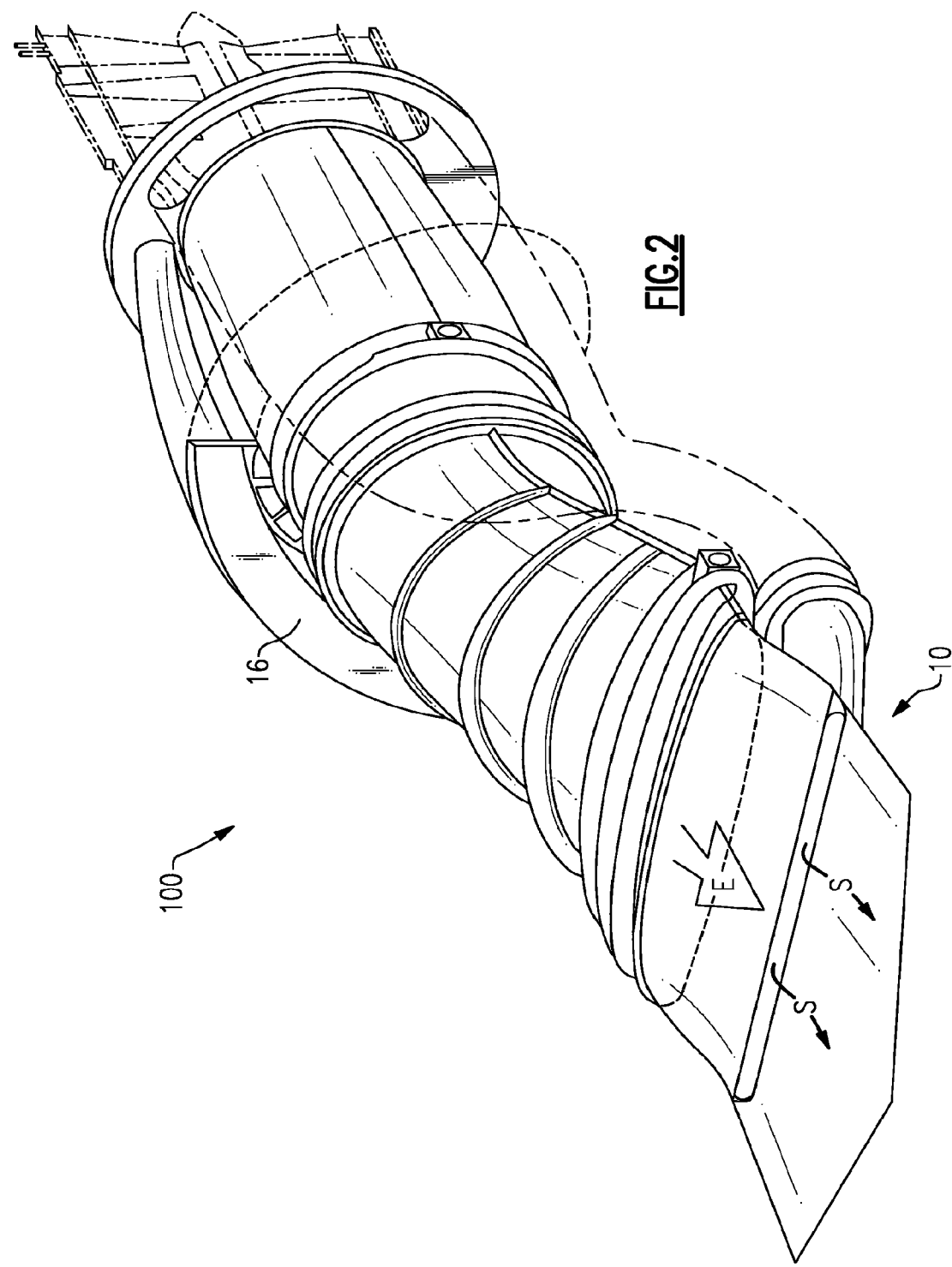
FIG. 2 is a cross-sectional perspective diagram of the gas turbine engine of FIG. 1.

As shown in FIGS. 1 and 2, gas turbine engine 100 includes a fan section 101, a compressor section 102, a combustion section 104, a turbine section 106, and an exhaust section 108. The compressor section 102, combustion section 104 and turbine section 106 are generally referred to as the core engine. A central longitudinal axis of the engine A extends longitudinally through these sections.

A secondary duct 110 and a primary duct 112 respectively define an at least partially annular secondary flow path 114 at least partially around a perimeter of a primary flow path 118 which directs a primary combustion core gas exhaust flow (illustrated schematically by arrow E). The secondary duct 110 in one non-limiting embodiment is a bifurcated duct arrangement which join at the generally planar secondary nozzle 12 (FIG. 2). The primary duct 112 is generally circular in cross-section at an upstream segment and transitions into the generally planar primary nozzle 14 at an aft end thereof. The secondary nozzle 12 and the primary nozzle 14 in the disclosed non-limiting embodiment include a straight shaped trailing edge, however, it should be understood that any other configuration may alternatively be utilized. It should be understood that the engine duct structure 110, 112 may also at least partially define various flow paths other than the disclosed secondary flow path 114.

Engine 100 includes a nozzle assembly 10, located at the aft end of the exhaust section 108, that defines the generally planar secondary nozzle 12 and the generally planar primary nozzle 14 adjacent thereto. The secondary flow path 114 guides a secondary flow S typically sourced from the fan section 101 and/or the compressor section 102. The secondary flow S is utilized for a multiple of purposes including, for example, cooling, pressurization, and mixing with the primary combustion core gas exhaust flow E prior to discharge through the nozzle assembly 10 during particular operational profiles.

The secondary flow S as defined herein is any flow different from the primary combustion core gas exhaust flow E such as a variable cycle third stream fan flow stream That is, the generally planar second nozzle 12 may be a third stream exhaust nozzle which regulates a third flow stream selectively sourced from the fan section 101 and/or the compressor section 102. Notably, performance of engine 100 can be affected by regulating the secondary flow S by varying the generally planar secondary nozzle 12.

Figure 3:
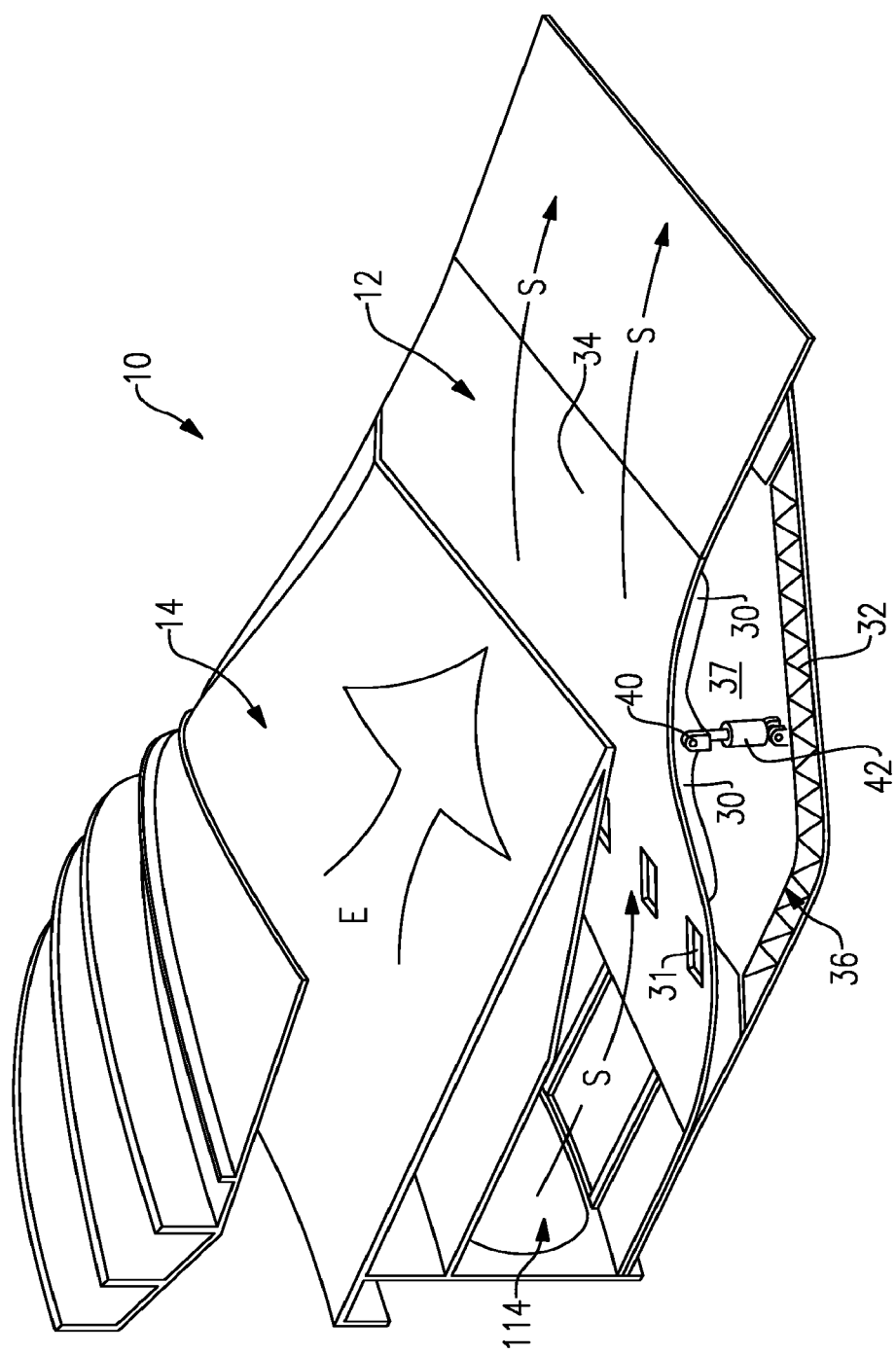
FIG. 3 is a perspective diagram depicting an exemplary embodiment of a nozzle assembly.

In this regard, reference is made to the perspective diagram of FIG. 3, which depicts an exemplary embodiment of the nozzle assembly 10 that incorporates a flexible panel 34. As shown in FIG. 3, flexible panel 34 at least partially defines the generally planar secondary nozzle 12 to influence the secondary flow S and thereby the primary combustion core gas exhaust flow E exiting through the nozzle assembly 10.

The flexible panel 34 is configured to be variably deflected along a range of positions between a full open position, at which the generally planar secondary nozzle 12 exhibits a maximum exit area, and a full closed position, at which the generally planar secondary nozzle 12 exhibits a minimum exit area. As the flexible panel 34 is variably positioned, the secondary flow S is selectively regulated.

The nozzle assembly 10 incorporates a support structure 32 located within a lower cavity 36. The support structure 32 is configured to provide alignment and structural support to the flexible panel 34 from the underside (i.e., the non-gas path side) as the flexible panel 34 is variably positioned. In some embodiments (such as in FIG. 3), the support structure 32 is a truss structure including multiple triangular units constructed with beam members whose ends are connected at joints.

The flexible panel 34 incorporates stiffening ribs 30 to maintain the throat profile of the nozzle assembly 10. The stiffening ribs 30 are structural stiffeners tailored to provide a desired aerodynamic shaping of the flexible panel 34 at key performance locations over the entire range of motion of the flexible panel 34. In this embodiment, the stiffening ribs 30 are formed of elongated strips of semi-rigid material extending across the width of the panel, although various other shapes, orientations and/or materials can be used in other embodiments.

In some embodiments, the flexible panel 34 may be all or partially comprised of a flexible elastomeric material, such as a fluorosilicone elastomer composite. Such a panel can be particularly well adept at sealing undesirable cracks and gaps. Metallics, organic composites, and ceramic composite materials are also envisioned to be suitable panel materials depending on placement within the panel structure and engine application. In higher temperature applications, for example, edge sealing could be performed with flexible metallic elements to cover cracks and gaps. Additionally, the relatively low translation and deflection requirements of the flexible panel 34 to vary the generally planar secondary nozzle 12 can result in reduced actuation load requirements for positioning the panel.

In some embodiments, the flexible panel 34 can incorporate a pressurized plenum 37 through communication of a selected portion of the secondary flow S through apertures 31 into lower cavity 36. The pressurize plenum 37 can be located, for example, on a side of the flexible panel 34 opposite the secondary flow S defined by the generally planar secondary nozzle 12. Such a pressurized plenum 37 is configured to provide pressure balancing of the flexible panel 34 to reduce actuation loads.

FIG. 4 is a schematic diagram depicting the nozzle assembly 10 of FIG. 3. As shown in FIG. 4, the secondary flow S passes through the secondary flow duct 114 and generally planar secondary nozzle 12. As the secondary flow S passes over the flexible panel 34, the secondary flow S is regulated by the generally planar secondary nozzle 12 as the shape is affected by the flexible panel 34 position.

Notably, stiffening ribs 30 are configured to deflect the flexible panel 34 to a desired shape in order to regulate the secondary flow S and affect engine performance. As the flexible panel 34 is deflected by the stiffening ribs 30, the generally planar secondary nozzle 12 is varied to operatively regulate the secondary flow S.

The stiffening ribs 30 are configured to be actuated via an actuator 42 that is coupled to the stiffening ribs 30 at actuation point 40. In this embodiment, actuator 42 moves the stiffening ribs 30 about actuation point 40 to vary the shape of the flexible panel 34. By way of example, actuator 42 can be a hydraulic motor, for example, located in the lower cavity 36 of the nozzle assembly 10.

The actuation mechanism between the actuator 42 and flexible panel 34 can be optimized for expected operating conditions and can incorporate one or more of a variety of linkages, levers, gears, and/or cam designs, chosen to facilitate reduced actuator loading yet increase operating speed.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. By way of example, in some embodiments, a flexible panel 34 can be configured to alter a nozzle throat asymmetrically in order to affect yaw vectoring of the flow. In some embodiments, this can be accomplished by the use of differential actuation of multiple actuators. All such modifications and variations are intended to be included herein within the scope of this disclosure and protected by the accompanying claims.

The invention claimed is:

1. A nozzle assembly for a gas turbine engine comprising:
   a flexible panel adjacent a two dimensional secondary nozzle in communication with a secondary flow path for a secondary flow, said second flow path adjacent to a primary flow path for a primary flow, said flexible panel operable to selectively define a range of positions to regulate said two dimensional secondary nozzle;
   a cavity on a non-gas side of said flexible panel; and
   an actuator located in said cavity, said actuator configured to deflect said flexible panel, said actuator oriented in a direction that is non-parallel to an axis of rotation of the gas turbine engine.

2. The nozzle assembly of claim 1, further comprising:
   a stiffening rib configured to provide a desired aerodynamic shape to the flexible panel.

3. The nozzle assembly of claim 2, wherein said actuator is connected to the stiffening rib and is operative to position the stiffening rib such that the flexible panel is deflected.

4. The nozzle assembly of claim 1, wherein the flexible panel is configured to be placed in at least one of a throat area and an exit area of a third stream exhaust nozzle to variably open and close the exit area of the third stream exhaust nozzle and operatively regulate a third stream exhaust.

5. The nozzle assembly of claim 1, wherein the flexible panel is formed at least partially of an elastomeric material.

6. The nozzle assembly as recited in claim 5, wherein said secondary flow is selectively sourced only from a fan section of the gas turbine engine and said primary flow includes at least a combustion core gas exhaust flow sourced from a turbine section of the gas turbine engine and a flow from said fan section.

7. The nozzle assembly as recited in claim 5, wherein said secondary flow is selectively sourced only from a fan section of the gas turbine engine and said primary flow includes at least a combustion core gas exhaust flow sourced from a turbine section of the gas turbine engine and a flow from a compressor section.

8. The nozzle assembly of claim 1, wherein the flexible panel is formed at least partially of an organic matrix composite.

9. The nozzle assembly of claim 1, wherein the flexible panel further comprises a stiffening stay operative to maintain a profile of a throat area.

10. The nozzle assembly of claim 1, wherein the flexible panel further comprises a support structure operative to support the flexible panel.

11. The nozzle assembly as recited in claim 1, wherein said secondary flow is selectively sourced only from a fan section of the gas turbine engine and said primary flow includes at least a combustion core gas exhaust flow sourced from a turbine section of the gas turbine engine and a flow from said fan section.

12. The nozzle assembly as recited in claim 1, wherein said secondary flow is selectively sourced only from a fan section of the gas turbine engine and said primary flow includes at least a combustion core gas exhaust flow sourced from a turbine section of the gas turbine engine and a flow from a compressor section.

13. A nozzle assembly for a gas turbine engine, the nozzle assembly comprising:
a two-dimensional secondary nozzle having a throat area and an exit area;
a flexible panel operative to variably alter at least one of the throat area and the exit area to regulate a secondary flow from the two-dimensional secondary nozzle, said secondary flow different than a combustion core gas exhaust flow sourced from a turbine section of the gas turbine engine;
a cavity on a non-gas side of said flexible panel; and
an actuator located in said cavity, said actuator configured to deflect said flexible panel, said actuator oriented in a direction that is non-parallel to an axis of rotation of the gas turbine engine.

14. The nozzle assembly of claim 13, further comprising:
a stiffening rib operative to deflect the flexible panel such that at least one of the throat area and the exit area is altered.

15. The nozzle assembly of claim 14, wherein said actuator is connected to the stiffening rib and is operative to deflect the flexible panel by positioning the stiffening rib.

16. The nozzle assembly of claim 13, wherein the panel is operative to symmetrically affect the secondary flow with respect to yaw.

17. The nozzle assembly of claim 13, wherein the nozzle assembly further comprises a support structure operative to support the flexible panel.

18. The nozzle assembly of claim 13, wherein said cavity is operative to reduce an actuation load associated with positioning of the panel by reducing pressure imbalances on the non-gas side and a gas path side of the flexible panel.

19. A gas turbine engine comprising:
a secondary flow duct with a two-dimensional secondary nozzle to communicate a secondary flow therethrough;
a primary flow duct with a two-dimensional primary nozzle to communicate primary flow therethrough, said two-dimensional primary nozzle adjacent to said two-dimensional secondary nozzle, wherein said primary flow includes at least a combustion core gas exhaust flow sourced from a turbine section of the gas turbine engine, and wherein said secondary flow is different than said combustion core gas exhaust flow;
a flexible panel adjacent said two-dimensional secondary nozzle, said flexible panel operable to selectively define a range of positions to regulate said two-dimensional secondary nozzle;
a cavity on a non-gas side of said flexible panel; and
an actuator located in said cavity, said actuator configured to deflect said flexible panel, said actuator oriented in a direction that is non-parallel to an axis of rotation of the gas turbine engine.

20. The gas turbine engine of claim 19, further comprising a stiffening rib configured to deflect the flexible panel.

21. The gas turbine engine of claim 20, wherein said actuator is connected to the rib and is configured to operatively rotate the stiffening rib and deflect the flexible panel in a throat area and an exit area of the two-dimensional secondary nozzle.

22. The gas turbine engine of claim 20, wherein the two-dimensional secondary nozzle is a third stream exhaust nozzle assembly.

23. The gas turbine engine of claim 20, wherein further comprising a stiffening stay configured to maintain a profile of a throat area of said two-dimensional secondary nozzle.

24. The gas turbine engine of claim 19, wherein said flexible panel is located on one side of said two-dimensional secondary nozzle opposite said two-dimensional primary nozzle.

25. The gas turbine engine of claim 19, wherein said two-dimensional secondary nozzle is downstream of said two dimensional primary nozzle.

26. The gas turbine engine of claim 19, wherein said two-dimensional secondary nozzle is adjacent to said two-dimensional primary nozzle.

* * * * *